Dec. 11, 1923.  F. A. GRIER, JR  1,477,440
COUPLING DEVICE
Filed Sept. 11, 1920  2 Sheets-Sheet 1
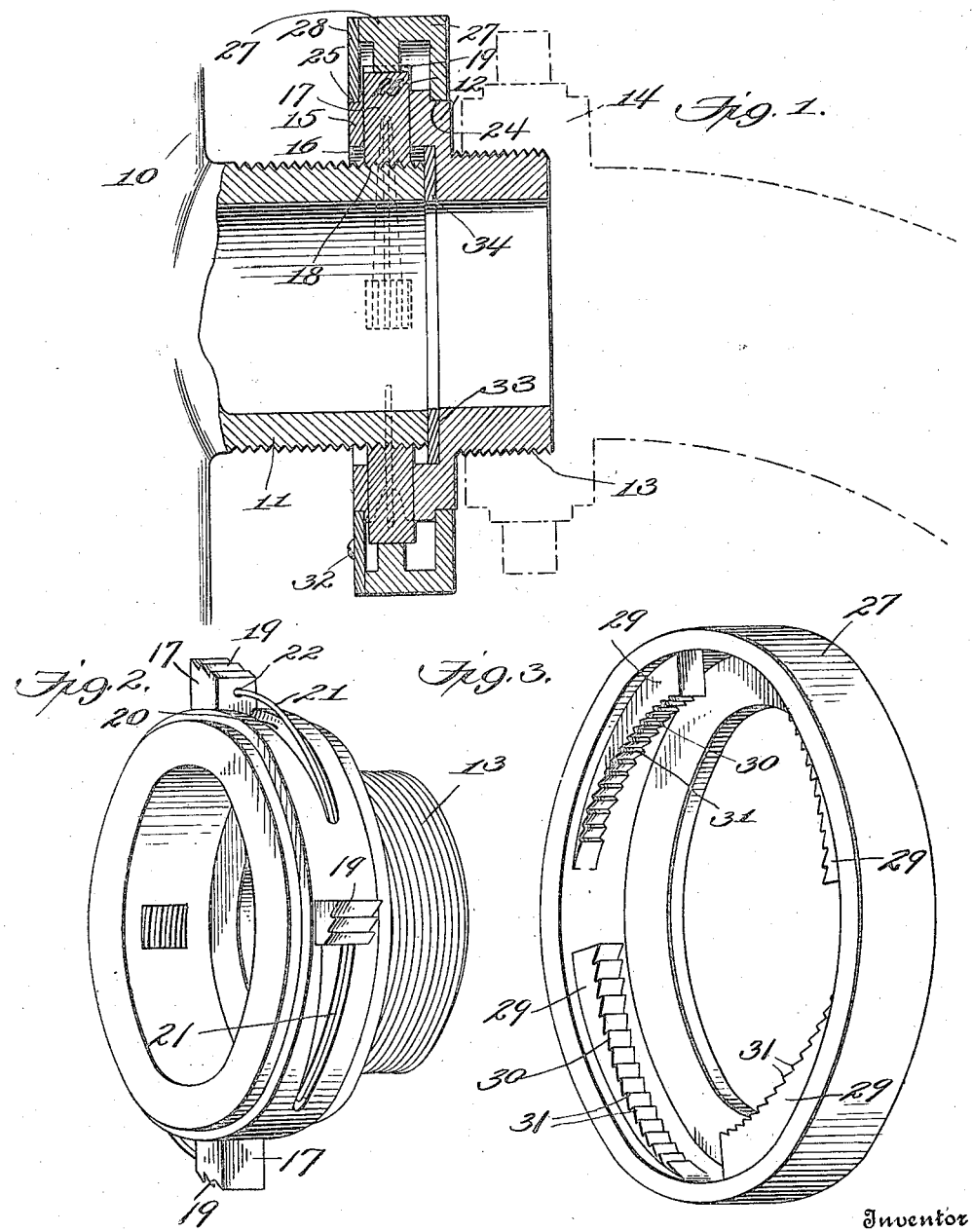
Inventor
Frederick A. Grier Jr.
By James L. Norris
Attorney
Witness Dec. 11, 1923.

F. A. GRIER, JR
COUPLING DEVICE
Filed Sept. 11, 1920

Inventor
Frederick A. Grier Jr.

Witness

By
Attorney

Patented Dec. 11, 1923.

1,477,440

UNITED STATES PATENT OFFICE.

FREDERICK A. GRIER, JR., OF SALISBURY, MARYLAND.

COUPLING DEVICE.

Application filed September 11, 1920. Serial No. 409,516.

*To all whom it may concern:*

Be it known that I, FREDERICK A. GRIER, Jr., a citizen of the United States, residing at Salisbury, in the county of Wicomico and State of Maryland, have invented new and useful Improvements in Coupling Devices, of which the following is a specification.

This invention relates to a coupling device of general application, but primarily intended as a means for quickly attaching a fire hose to a hydrant.

My invention provides a coupling which may be used with hydrant connections of different sizes so that hose equipment may be utilized without experiencing any difficulty from this source.

My invention also provides means for positively locking parts of the coupling device from relative movement thereby maintaining the binding action of the same on the threaded connection of the hydrant.

Other objects of my invention will become apparent on reference to the following specification and accompanying drawings.

In the drawings:—

Figure 1 is a vertical section of the coupling device as applied to the threaded connection of a fire hydrant.

Figure 2 is a perspective view of the coupling member.

Figure 3 is a perspective view of the rotatable collar showing the ratchet cam devices.

Like numerals represent corresponding parts throughout the several views of the drawings.

Figure 4:
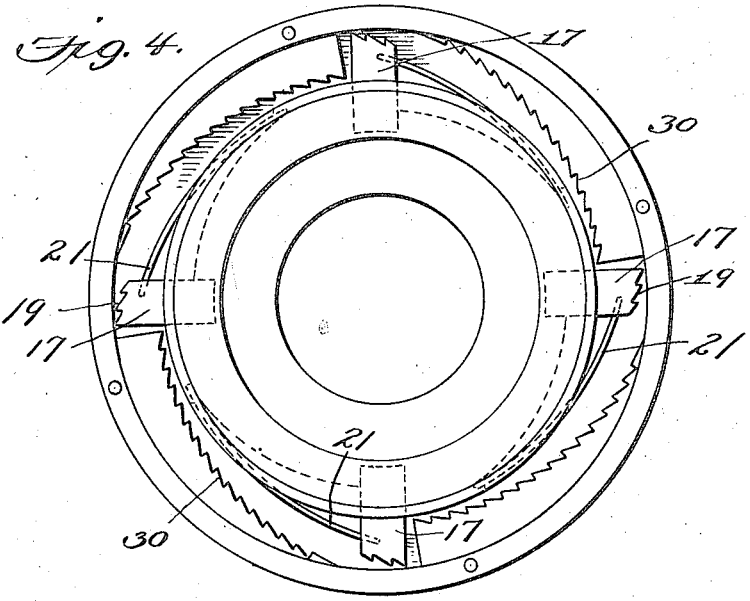
Figure 4 is an end view of the socket portion of the coupling member with the retaining plate removed.
Figure 5:
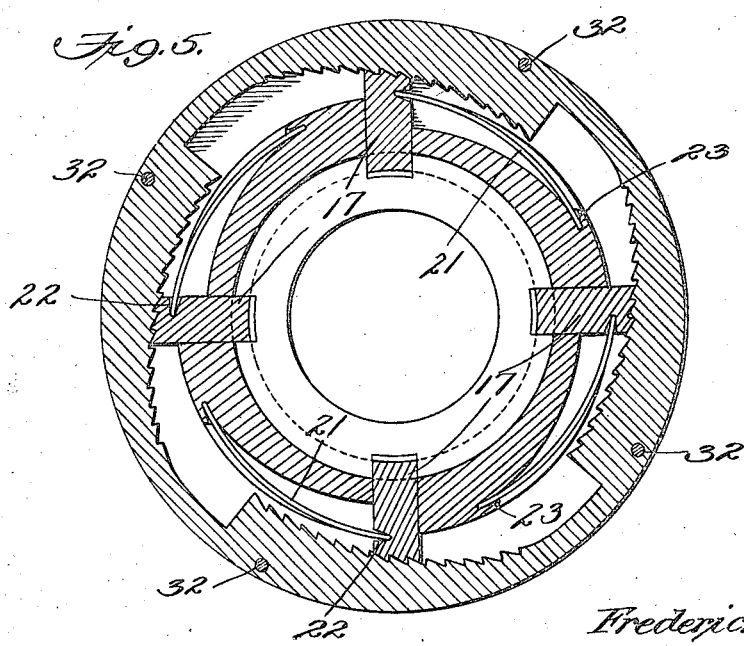
Figure 5 is a sectional view through the socket member and rotatable collar showing the ratchet cams and sliding blocks in engaging relation.

The numeral 10 designates a fire hydrant having the usual threaded connection 11 adapted to engage with the threads of a socket of a hose connection. The device comprising my invention consists of a coupling member 12 having a threaded boss or male member 13 which is adapted to engage the threaded connection of a fire hose shown in dotted lines 14, Figure 1. The coupling member 12 is provided with an enlarged annular socket portion 15 having radial openings 16 formed therein and as herein shown four of these openings are employed, spaced 90° apart.

Blocks 17 are slidably mounted in these openings, said blocks having at their inner terminals screw threads 18 adapted to engage the screw connection 11, and at the outer terminals said blocks are provided with ratchet teeth 19 for a purpose which will hereinafter appear. The outer periphery of the socket portion 15 adjacent the openings 16 is provided with recesses 20 of tapering depth, which recesses provide clearance spaces for the wire springs 21 each of which engages at one end within an aperture 22 formed near the ratchet end of a sliding block 17 and at the other end in an aperture 23 formed at the terminal of the shallow end of each of the tapered recesses 20. The socket portion 15 is provided at opposite sides with reduced portions 24 and 25 forming annular shoulders adapted to receive respectively a flange 26 of a collar 27 and the inner circumferential edge of an annular cover 28.

The collar 27 is provided with an annular portion the inner periphery of which is normally spaced from the outer periphery of the socket 15 in such relation that the threaded ends of the sliding blocks are normally maintained flush with the inner circumference of the socket 15 and the springs 21 are thereby maintained under slight tension. A plurality of projecting elements 29 are formed on the inner surface of the collar 27 and each of these elements is provided with a cam surface 30 on which are formed ratchet teeth 31 for engaging with the terminal ratchet teeth of the sliding blocks. As herein shown the cam elements are four in number, corresponding to the number of sliding blocks, and the small end of each of the cam surfaces is in spaced relation to the larger end of the next adjacent and in this space the ratchet terminals of the sliding blocks are normally maintained by the action of the springs 21. It will be noted that the collar 27 is rotatably mounted on the socket portion 15 so that when it is turned in the proper direction the ratchet teeth 30 will pass over the ratchet teeth 19 and the cam surface 30 will force the sliding blocks inwardly, where the engaging relation between said ratchet teeth will prevent relative movement between the collar and coupling member tending to release said blocks from their inward position.

Fastening devices such as screws 32 are adapted to detachably secure the cover 28 to the collar 27 thus enclosing the operative parts and protecting the same from the accumulation of dust and dirt, which may interfere with their proper functioning.

The threaded boss 13 is of course of smaller diameter than the socket portion 12 and the shoulder 33 formed therebetween is adapted to receive a washer 34 which is preferably of yielding material such as rubber or fiber and when the coupling device is in operative position the washer 34 abuts against the end of the connection 11 of the fire hydrant.

In operation the coupling member 12 is placed on the fire hydrant until the washer 34 abuts against the end of the connection 11 which can be accomplished without any screwing action by having the sliding blocks 16 in their normal position in which case their effective diameter is greater than that of the connection 11. With the coupling member in this position, the collar 27 is rotated and since further longitudinal movement of the coupling member will meet with the resistance afforded by the compression of the washer 34, the sliding block 17 will be forced into firm engagement with the threads of the connection 11 and the coupling will be advanced slightly by means of this screw threaded connection thereby placing the washer 34 under tight compression and also forcing the threaded ends of blocks 17 into engagement with a corresponding radial force. The ratchet teeth 19 engaging with the ratchet teeth 31 will prevent any retrograde movement of the collar relative to the coupling member and thereby maintain the same in firm engagement with the pipe connection 11. The cooperating ratchet teeth also perform an important office in assisting the release of the coupling from the fire hydrant. It will be understood that when the coupling is in tight engagement with the hydrant, the reactive force of the washer 34, resisting compression, is transmitted through the parts, causing a close frictional pressure between the outside faces of the threads on the inner end of the blocks and the adjacent faces of the threads on the fire hydrant. In the absence of positive interengaging means on the outer ends of the blocks and on the cams, it is expectable that the frictional hold between the aggregate surface of the threads will exceed that between the cam and blocks, so that upon initial releasing movement of the collar 27, the latter will move relatively to said blocks, leaving the latter unmoved, in the fully engaged position of the parts. By the provision of the ratchet teeth 19 and 31, the interengaging abrupt shoulders thereof positively interlock, enforcing movement of the blocks with said collar along the threads of the fire hydrant in the direction of release, immediately relieving the pressure of the washer 34 and thereby rendering easy the subsequent unscrewing operation of the coupling from the fire hydrant.

It will be understood that the embodiment of the invention shown in this application is illustrative only and that I do not confine myself to the details of construction and arrangement of parts herein shown and described, in carrying out my invention, the scope of which is indicated by the appended claims.

Having described my invention, what I claim as new and desire to secure by Letters Patent, is:—

1. In a device of the class described, a coupling member having openings in the walls thereof, blocks slidably mounted in said openings having screw threads at one end and ratchet teeth at the other end, spring means tending to force said blocks in one direction, a collar rotatably mounted on said member, elements projecting from said collar having cam surfaces, said cam surfaces having ratchet teeth thereon adapted to coact with the ratchet teeth of said blocks whereby on rotation of said collar in one direction said blocks are forced in a direction opposed to said spring means and upon rotation in the opposite direction, said collar and blocks are positively locked against relative movement enforcing movement of said blocks with said collar.

2. In a device of the class described, a coupling member, a collar rotatably mounted thereon, blocks slidably mounted in said coupling member having screw threads on one end and ratchet teeth on the other end thereof, and means carried by said collar for moving said blocks radially when said collar is rotated in one direction relatively to said member and when rotated in the other direction locking said collar and blocks against relative movement, enforcing movement of said blocks with said collar.

3. In a device of the class described, sliding blocks having ratchet teeth at one end and screw threads at the other end, and ratchet cams movable relatively to said blocks in one direction for forcing said screw threads into firm engagement with a pipe connection said ratchet cams engaging the ratchet teeth of said blocks to lock said cams and blocks against relative movement when said cams are moved in the opposite direction, whereby to enforce movement of said blocks with said collar.

4. In a device of the class described, sliding blocks having ratchet teeth at one end and screw threads at the other end thereof and cams having ratchet teeth cooperable with the teeth on said blocks.

5. In a device of the class described, a coupling member having radial openings formed therein, a collar rotatably mounted thereon, blocks slidably mounted in said openings, spring means for normally maintaining said blocks in retracted position, cam elements projecting from the inner surface of said collar adapted to engage and force said blocks radially inward when moved in one direction, and cooperating means on said cam elements and blocks for positively locking said blocks and cam elements against relative movement when said cam elements are moved in the other direction, whereby to enforce movement of said blocks with said cam elements.

In testimony whereof I have hereunto set my hand in presence of two subscribing witnesses.

FREDERICK A. GRIER, Jr.

Witnesses:
HOWARD H. RUARK,
ROXIE PUSEY.